(12) United States Patent
Dahms et al.

(10) Patent No.: US 6,769,720 B2
(45) Date of Patent: Aug. 3, 2004

(54) COUPLING ASSEMBLY WITH PROFILED RAMP

(75) Inventors: Jason W. Dahms, Bowling Green, OH (US); Loren H. Uthoff, Jr., Northville, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/228,793

(22) Filed: Aug. 27, 2002

(65) Prior Publication Data

US 2004/0041394 A1 Mar. 4, 2004

(51) Int. Cl.⁷ .............................................. F16L 37/00
(52) U.S. Cl. ........................ 285/308; 285/321; 285/317
(58) Field of Search ................................ 285/307, 308, 285/321, 317, 39

(56) References Cited

U.S. PATENT DOCUMENTS

| | | |
|---|---|---|
| 1,771,949 A | 7/1930 | Blanchard |
| 2,092,116 A | 9/1937 | Hansen |
| 2,225,610 A | 12/1940 | Christain |
| 2,299,643 A | 10/1942 | Moody |
| 2,479,960 A | 8/1949 | Osborn |
| 2,805,089 A | 9/1957 | Hansen |
| 2,848,255 A | 8/1958 | Klein et al. |
| 3,120,968 A | 2/1964 | Calvin |
| 3,177,018 A | 4/1965 | Goodwin |
| 3,398,977 A | 8/1968 | Yoneda |
| 3,773,360 A | 11/1973 | Timbers |
| 3,887,222 A | 6/1975 | Hammond |
| 4,055,359 A | 10/1977 | McWethy |
| 4,105,226 A | 8/1978 | Frey et al. |
| 4,111,464 A | 9/1978 | Asano et al. |
| 4,240,654 A | 12/1980 | Gladieux |
| 4,311,328 A * | 1/1982 | Truchet ...................... 285/308 |
| 4,401,326 A | 8/1983 | Blair |
| 4,750,765 A | 6/1988 | Cassidy |
| 4,872,710 A | 10/1989 | Konecny |
| 4,906,031 A | 3/1990 | Vyse |
| 5,005,877 A | 4/1991 | Hayman |
| 5,022,687 A | 6/1991 | Ariga |
| 5,042,848 A | 8/1991 | Shiozaki |
| 5,076,541 A | 12/1991 | Daghe |
| 5,226,682 A | 7/1993 | Marrison et al. |
| 5,301,408 A | 4/1994 | Berman |
| 5,553,895 A | 9/1996 | Karl et al. |
| 5,570,910 A | 11/1996 | Highlen |

FOREIGN PATENT DOCUMENTS

| | | |
|---|---|---|
| EP | 2 554 543 A1 | 5/1985 |
| EP | 0 373 920 A1 | 6/1990 |
| EP | 0 615 089 A1 | 9/1994 |
| EP | 1 235 023 A1 | 8/2002 |
| IT | 659848 | 11/1960 |
| WO | WO 02/29300 A2 | 4/2002 |

\* cited by examiner

*Primary Examiner*—David Bochna
(74) *Attorney, Agent, or Firm*—Loren H. Uthoff, Jr.

(57) ABSTRACT

A coupling assembly includes a female member having a receiving end with an axially extending passageway and inwardly facing groove extending outwardly from said passageway in a position spaced from the receiving end. A split metal locking ring is positioned in the groove. A male member is sized to be received in said receiving end and includes a rib having a ramp where the ramp in a first embodiment curves outwardly to an apex and in a first alternate embodiment curves outwardly to a flat and in a second alternate embodiment increases in height in a linear fashion until a relatively short distance from the flat where it curves outwardly to meet the flat, the rib also has a shoulder tapering away from the forward end and inwardly toward the axis. Upon insertion of the male member into the female member, the split metal ring is expanded as it rides over the ramp, engages the cylindrical surface and retracts to a smaller diameter approaching its original size to engage the shoulder thereby locking the male member into engagement with the female member. A release sleeve is mounted on the male member and is axially movable relative thereto to push the split locking ring up and off of the tapering shoulder to thereby disengage the male member from the female member.

9 Claims, 7 Drawing Sheets

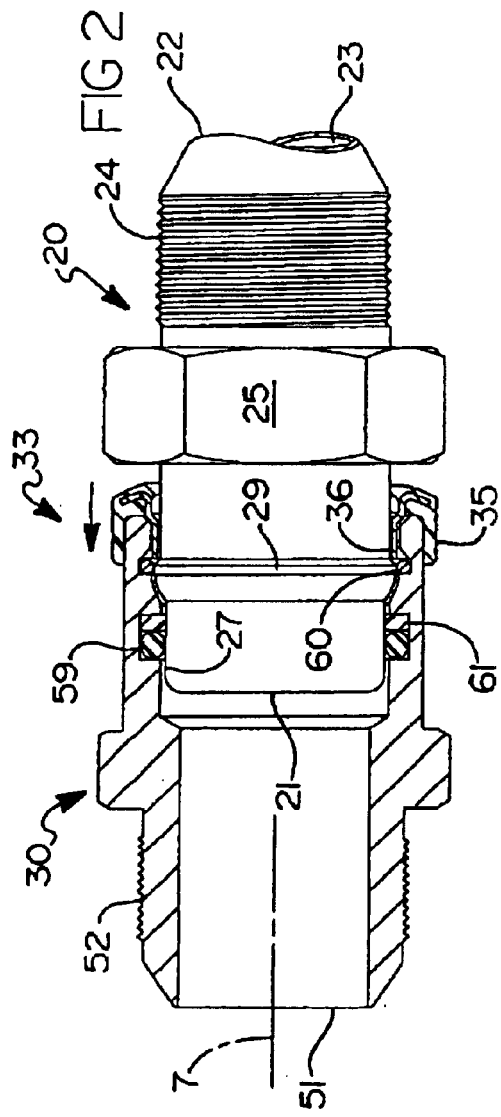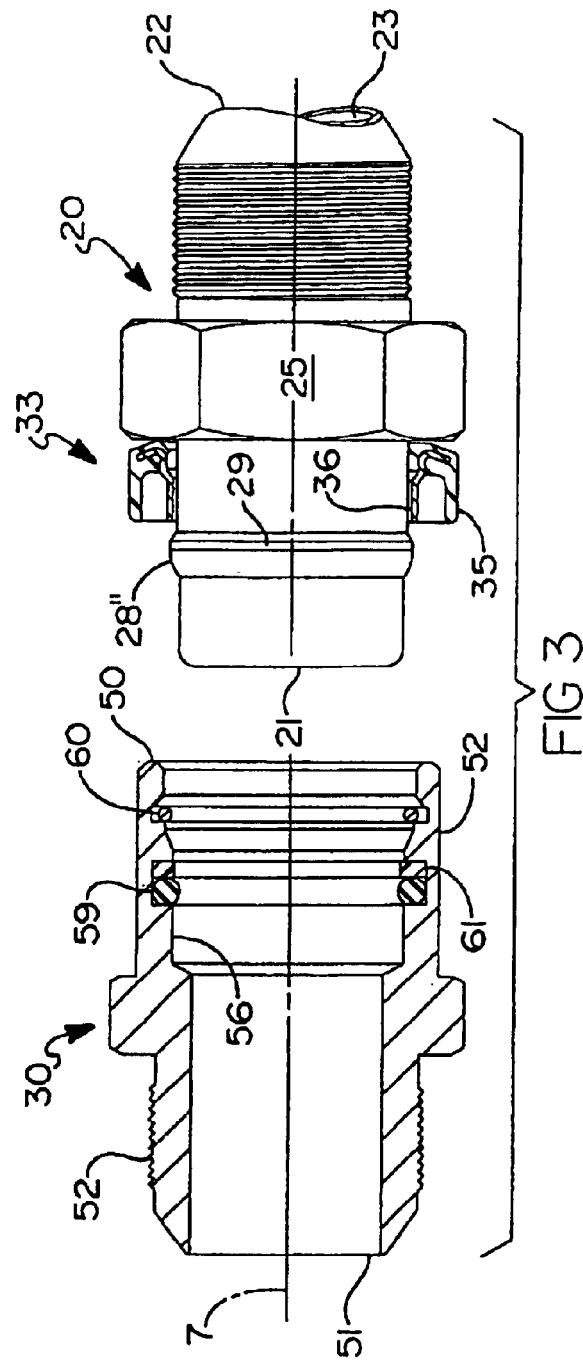

US 6,769,720 B2

COUPLING ASSEMBLY WITH PROFILED RAMP

FIELD OF THE INVENTION

The present invention relates to push-to-connect fluid connectors and more specifically the present invention relates to push-to-connect fluid connectors which use a latch ring where the ridge of the male connector has been modified to incorporate a profiled ramp for ease of connection.

BACKGROUND OF THE INVENTION

There are many industrial applications where a high pressure hydraulic system requires that several connections be made between a hose and a component such as a pump, motor, valve etc. Because there were no push-to-connect (threadless) connection system available that can satisfactorily operate at high pressure, prior art systems have made use of threaded fittings to make this connection. Recently, push-to-connect type of connections have become available which can operate at high pressures but there have been concerns that in some instances, they are more difficult to connect than desired. For ease of assembly, it would be an improvement if the force required to make the connection were reduced or tailored to make false connections less likely to occur.

SUMMARY OF THE INVENTION

The present invention reduces the maximum force required to connect a male connector to a female connector to complete a push-to-connect type of fluid connection system. The profile of the male connection is altered to reduce the maximum force required to push a latch ring up the ramp, over the apex and onto a shoulder. The latch ring is retained and concurrently contacts the shoulder of the male connector and the chamfer on the female connector so as to retain the male to the female.

One or more radius sections are introduced to the ridge on the male connector which serves to reduce the maximum force required to push the latch ring into place when connecting the male to the female connector. A radius is added to the transition between the ramp and the flat and/or the ramp is radiused to provide the desired force to connect verses displacement curve to enhance connectability of the system. One alternate embodiment does not include a flat section while incorporating the radiused ramp and the shoulder section.

BRIEF DESCRIPTION OF THE DRAWINGS

FIG. 2 is a cross-sectional view of the male connector of the present invention in partial engagement with a female connector;

FIG. 3 is a cross-sectional view of the male connector of the present invention and a female connector;

DETAILED DESCRIPTION OF THE PREFERRED EMBODIMENTS

Figure 1:
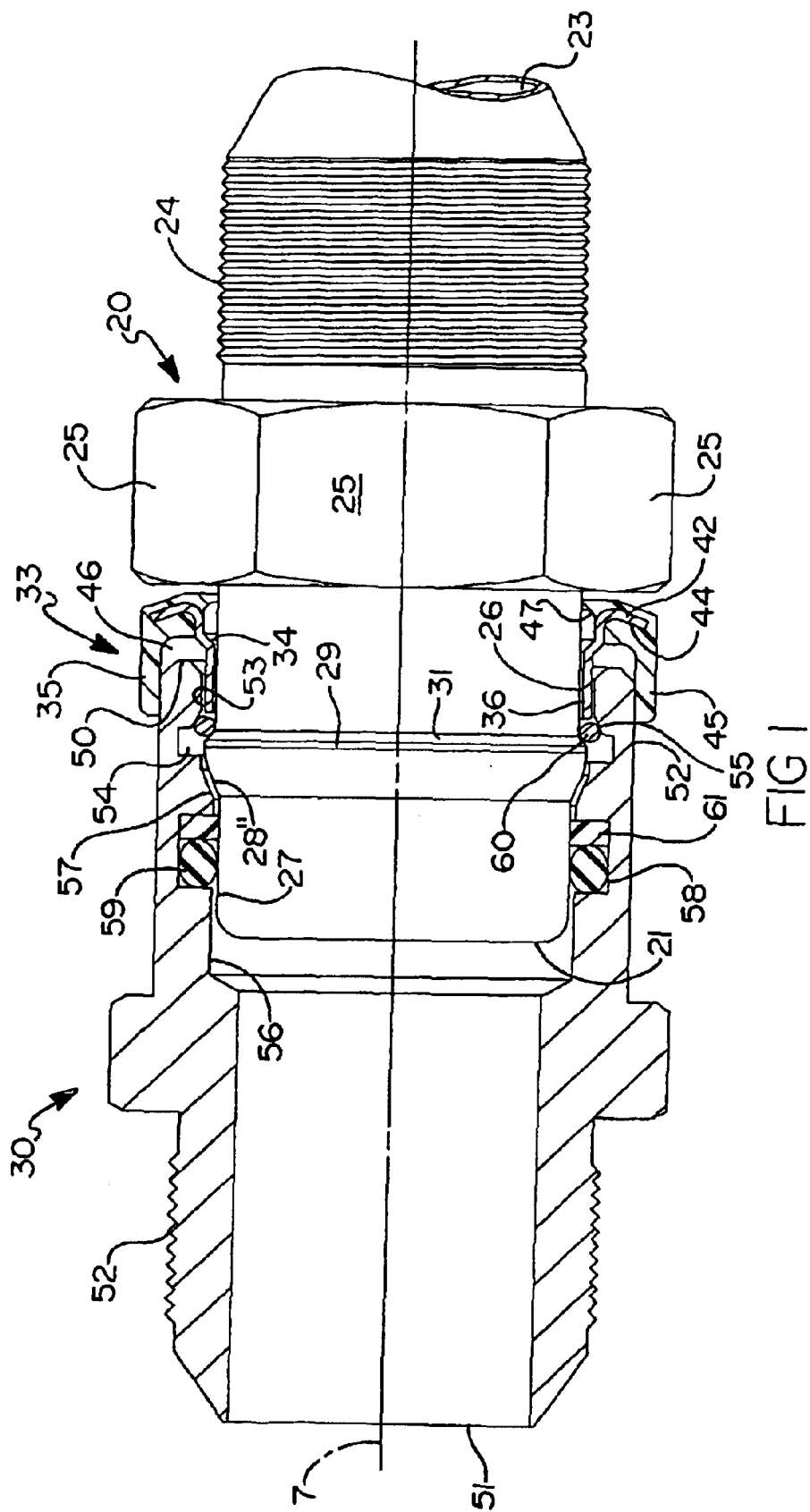
FIG. 1 is a cross-sectional view of the fluid connection system of the present invention.

Certain terminology will be used in the following description for convenience in reference only and will not be limiting. The terms "forward" and "rearward" will refer to directions forward and rearward of the coupling as shown in the drawings. The terms "rightward" and "leftward" will refer to directions in the drawings in connection with which the terminology is used. The terms "inwardly" and "outwardly" will refer to directions toward and away from, respectively, the geometric center of the apparatus. The terms "upward" and "downward" will refer to directions as taken in the drawings in connection with which the terminology is used. All foregoing terms mentioned above include the normal derivatives and equivalents thereof.

Now referring to FIGS. 1 through 3, the coupling assembly of the present invention includes a male member 20 and a female member 30. Each of the male member 20 and female member 30 extends along an axis 7 when the assembly is in the coupled position as shown in FIGS. 1 and 2. The male member 20 extends from a leading end 21 intended for insertion in the female member 30 to a trailing end 22 and has a passageway 23 extending therethrough. If desired, the trailing end 22 may be provided with external threads 24 for attachment to a threaded coupling (not shown) and a series of flats 25 defining a hexagonal cross section for engagement by a wrench.

Forwardly of the hexagonal cross section defined by the flats 25, the male member 20 has a trailing cylindrical exterior surface 26 and a leading exterior surface 27 which are separated by a rib. The rib includes a tapered radiused ramp 28 extending rearwardly and outwardly from the leading exterior surface 27 at an angle Y relative to the axis 7 in the range of 10 degrees to 25 degrees and preferably at an angle of 18 degrees (see FIG. 5). The ramp 28" extends to a cylindrical surface 29 which is parallel to the axis and extends rearwardly from the ramp 28" a distance A of at least 0.010 inch and, preferably at least 0.030 inch. The final portion of the rib is a shoulder 31 which tapers rearwardly and inwardly from said cylindrical surface 29 to meet said trailing exterior surface 26. The shoulder 31 should taper at an angle M in the range of 35° to 55° relative to the axis 7 and preferably at an angle of about 45° (see FIG. 5).

Now referring once again to FIG. 1, a cross-sectional view of another component of the male member 20, a separately formed release sleeve 33 consisting of a metal portion 34 and a thermoplastic and/or elastomeric (TPE) portion 35 is shown. The metal portion 34 includes a split cylindrical wall 36 having a plurality of axial slots. As may be seen in FIG. 3, the TPE portion 35 may be molded around the flange 42 and includes a flange portion 44 and a cylindrical wall portion 45 spaced from and substantially parallel to the split cylindrical wall 36 of the metal portion 34. During molding of the TPE portion 35 around the flange 42 of the metal portion 34, plastic and/or elastomeric material will flow into apertures formed in the flange 42 (not shown) to provide for secure attachment to the metal portion 34. The TPE portion 35 includes a sealing fin 47 extending radially inwardly from the flange portion 44. The sealing fin 47 extends inwardly sufficiently for to snugly engage the trailing cylindrical exterior surface 26 to thereby function as a dust seal to prevent dust from, or at least minimize the possibility of dust, entering the engaged coupling between the release sleeve 33 and the trailing exterior surface 26. See U.S. Ser. Nos. 09/784,258 an 09/964,319 the disclosures of which are hereby incorporated by reference for an alternate embodiment for the release sleeve 33.

Referring once again to FIGS. 1 through 3, the second female member 30 extends from a receiving end 50 to a remote end 51 which may have adjacent thereto external threads 52 or other suitable connection means for fastening to a separate connection (not shown). The portion of the second female member 30 adjacent the receiving end 50 is provided with an exterior cylindrical surface 52 having a size to be snugly received in the cylindrical wall 45 of the release sleeve 33 and an interior cylindrical surface 53 sized to receive therein the split cylindrical wall portion 36 of the metal portion 34 of release sleeve 33. An inwardly facing annular groove 54 extends outwardly from the interior cylindrical surface 53 and is sized to receive therein a split metal locking ring 60. A chamfer 55 extends at an angle inwardly from the annular groove 54 toward the receiving end 50 to meet the interior cylindrical surface 53. The angle N (see FIG. 5) between the chamfer 55 and the interior cylindrical surface 53 is in the range of 20° to 40° and is preferably 30°.

A second interior cylindrical surface 56 of smaller size than the first cylindrical surface 53 is positioned toward the remote end 51 from the annular groove 54 and is joined thereto by an inwardly tapering wall portion 57. The second interior cylindrical surface 56 is sized to receive the leading exterior surface 27 of the first male member 20. The second interior cylindrical wall surface 56 has formed therein an inwardly facing annular groove 58 in which is positioned an annular seal 59 of neoprene or other suitable sealing material and a rigid plastic ring 61 which is positioned in the groove 58 between the annular seal 59 and the receiving end 50. The plastic ring 61 has an aperture sized to snugly receiving the leading exterior surface 27 of the first male member and the annular seal 59 is sized to sealingly receive and engage such leading exterior surface 27. The presence of the rigid plastic ring 61 in a position to be engaged by the leading end 21 of the first male member 20 serves to protect the annular seal 59 from cutting or other damage upon insertion of the leading exterior surface 27 therethrough. The rigid plastic ring 61 also serves to protect the annular seal 59 from damage when used in systems having high impulse flow of fluid.

Positioned in the annular groove 54 is a split metal locking ring 60 formed of a spring tempered phosphoric bronze material or, preferably, a spring tempered stainless steel. The split locking ring 60 is provided with a first end and a second end which should either be in abutting relationship or have a typical gap of 0.030 inch when the first male member 20 is disconnected from the second female member 30. The split locking ring 60, when the parts are in the disconnected position, has an external diameter smaller than the diameter defined by the outermost portion of the annular groove 54 but larger than the diameter of the first interior cylindrical surface 53. The split locking ring 60 has an internal diameter substantially equal to, preferably, slightly smaller than that of the trailing exterior surface 26 of the male member 20 to snugly engage such trailing exterior surface 26 when the male member 20 is engaged to the female member 30. As will be appreciated, the internal diameter of the split locking ring 60 is therefore, significantly smaller than the diameter of the cylindrical surface 29. The split locking ring 60, by virtue of its dimensions, will be retained in the annular groove 54 when the first male member 20 is disconnected from the second female member 21. However, by virtue of its being split, the diametrical size of the locking ring 60 may be expanded and the end portions become separated as the locking ring 60 moves over the ramp 28" and cylindrical surface 29 upon insertion of the first male member 20 into the second female member 30.

Thus, as may be seen FIGS. 1, 2 and 3, upon insertion of the first male member 20 into the second female member 30, the leading end 21 and leading exterior surface 27 will pass through the split locking ring 60 until the ramp 28" reaches the split locking ring 60. Continued inward movement of the male member 20 will cause the ramp 28" to expand the locking ring 60 thereby opening up the gap between the ends 62 and 63 by increasing amounts as the locking ring 60 moves up to the maximum diameter of the ramp 28" and onto the cylindrical surface 29. As the cylindrical surface 29 moves past the split locking ring 60 upon continued forward movement of the first male member 20, the split locking ring 60, by virtue of the resilience of the metal will contract to a size approaching its original size and, in do so, will be positioned to prevent withdrawal of the first male member 20 from the second female member 30 by virtue of the split locking ring 60 being trapped between the shoulder 31 and the chamfer 55 formed in the female member 30.

As will be appreciated from viewing FIG. 1 the tapered shoulder 31 and the chamfer 55 are disposed at converging angles in the direction toward the annular groove 54 when the first male member 20 is engaged to the female member 30. This convergence results from the fact that the angle of the tapered shoulder 31 is greater than the angle of the chamfer 55 in relation to the axis 7 as previously set forth.

When the first male member 20 is fully engaged to the second female member 30, the leading exterior surface 27 is sealingly engaged to the annular seal 59 thereby preventing leaking of fluid. Additionally, receiving end 50 and portions of the second female member adjacent thereto are positioned in the gap 46 between the cylindrical wall portion 45 of the TPE portion 35 and the split cylindrical wall 36 of the metal portion. The exterior cylindrical surface 52 is snugly in contact with the interior of the cylindrical wall portion 45 thereby preventing, along with the sealing fin 47, dust or other contaminants from the entering the area around the split metal locking ring 60 when the members are in the engaged position of FIG. 1.

Again, as can be seen from FIG. 1, when the first male member 20 is in the fully coupled or engaged position with the second female member 30, there is a space between the receiving end 50 and the interior of the flange portion 44 which is, in effect, the end of the gap 46. Additionally, the leading end 38 of the release sleeve split cylindrical wall 36 is barely touching or, preferably, slightly spaced from the split metal locking ring 60. When it is desired to disconnect the first male member 20 from the second female member 30, it is simply necessary to move the release sleeve 33 toward the leading end 21 thereby causing the leading end 38 of the split cylindrical wall to urge the split metal locking ring 60 axially toward the rib and, in so doing, to be urged outwardly by the tapered shoulder 31 against which the split metal locking ring 60 is being urged by the release sleeve.

As will be appreciated, when the split metal locking ring 60 has been urged to a position in alignment with the cylindrical surface 29 of the rib, the first male member 20 will be released from the second female member 30 and may be removed therefrom. Inasmuch as the release sleeve 33 has a split cylindrical wall 36 with slots 37, the segments of the split cylindrical wall 36 between the slots 37 can be deflected outwardly by the tapered shoulder 31 thereby ensuring that the release sleeve 33 can be moved far enough toward the leading end 21 to ensure that it forces the split metal locking ring 60 out of engagement with the tapered shoulder 31 and into the annular groove 54 as it engages the cylindrical surface 29 thereby permitting release of the male member 20 from the female member. In being moved to the extreme release position toward the leading end 21, the portion of the release sleeve split cylindrical wall 36 adjacent the leading end 38 may be deflected outwardly by the movement of the leading end 38 against the tapered shoulder 31.

In the manufacture of couplings designed to meet standards of the Society of Automotive Engineers (SAE) it is customary to manufacture such couplings from G12000 series steel as set forth in the Unified Numbering System for SAE and the American Iron and Steel Institute (AISI) and are designed to be used with hydraulic hoses meeting standards established by SAE. For example, the prior art device shown in FIGS. 7 through 9 of U.S. Pat. No. 5,226,682 is suitable for operating with hydraulic hose meeting SAE Standard J517-Series 100R2. Couplings for use in automotive applications in Europe are also manufactured from G12000 series steel but must meet standards issued by Deutsches Institut fur Normung (DIN), Berlin, Germany. DIN Standard 20022 Part 2 includes standards for Type 2ST hoses which are more stringent than those of the corresponding SAE J517-Series 100R2 Pressure Standard.

Prior art couplings of the type utilizing a rib and a split metal lock ring which have been tested withstand pressures of four times the specified Operating Pressure for the SAE 100R2 Standards but not for the DIN Type 2ST Standards. In contrast, the coupling assembly of the present invention is capable of withstanding pressures of four times the specified Operating Pressures for both the SAE 100R2 Standards and the DIN Type 2ST Standards.

Figure 4:
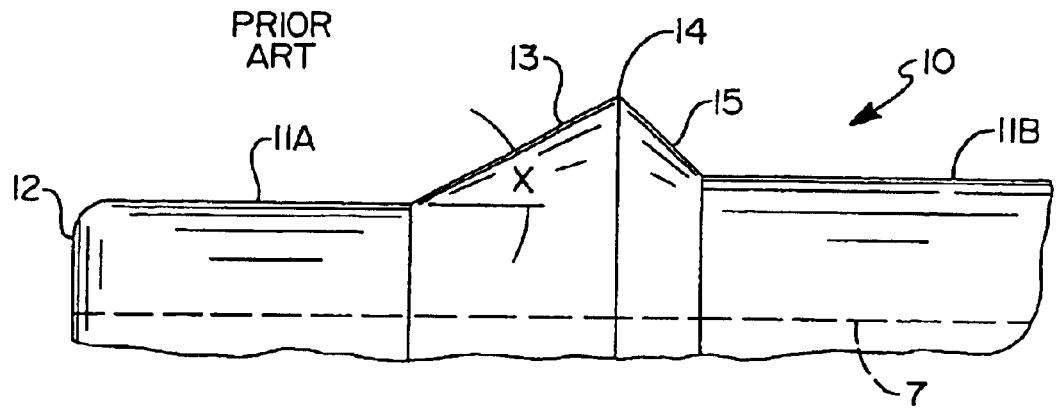
FIG. 4 is a partial perspective view of a first prior art male connector.

Now referring to FIG. 4, a partial cross-sectional view of a prior art male member 10 is shown. This embodiment is disclosed in U.S. Pat. Nos. 5,226,682 and 5,553,895 the disclosures of which are hereby incorporated by reference and includes a ramp 13 which uniformly increases at angle X in axial distance from centerline 17 along the leading exterior surface 11A to reach an apex 14. A shoulder 15 then joins the apex 14 to the trailing exterior surface 11B. The leading end 12 is inserted into a female coupling.

Figure 5:
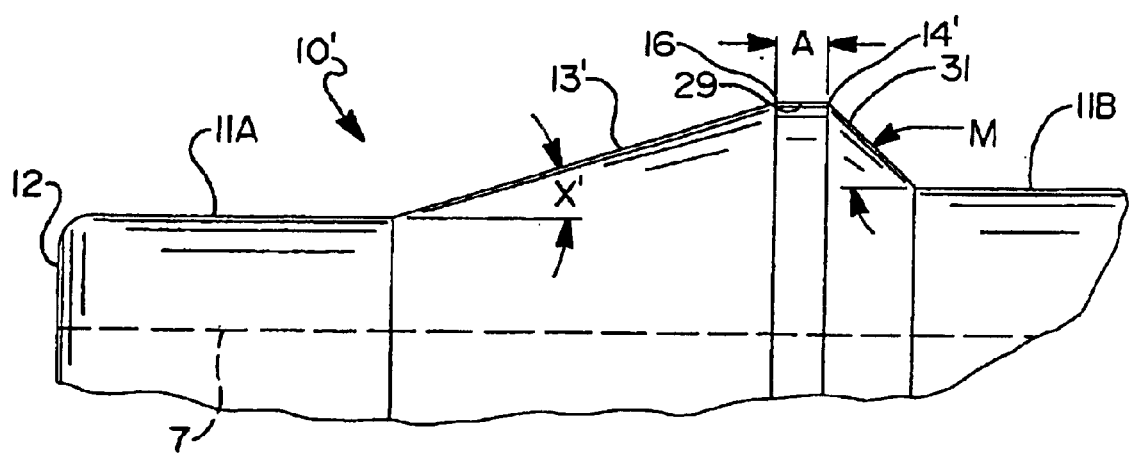
FIG. 5 is a partial cross-sectional view of a second prior art male connector.

FIG. 5 is a partial cross-sectional view of a prior art male member 20 as disclosed in U.S. Pat. No. 5,553,895 in FIG. 2 of that patent. Forwardly, of the hexagonal cross section defined by the flats 25, the male member 10' has a trailing cylindrical exterior surface 11B and a leading exterior surface 11A which are separated by a rib. The rib or ridge includes a tapered ramp 13' extending rearwardly and outwardly from the leading exterior surface 11A at an angle X' relative to the axis 7 in the range of 10° to 25° and preferably at an angle of 18°. The ramp 13' extends to a cylindrical surface or flat 29 which is parallel to the axis and extends rearwardly from the ramp 13' a distance A of at least 0.010 inch and, preferably at least 0.030 inch. The final portion of the rib is a shoulder 31 which tapers rearwardly and inwardly from said cylindrical surface 29 to meet said trailing exterior surface 11B. The shoulder 31 should taper at an angle M in the range of 35° to 55° relative to the axis 7 and preferably at an angle of about 45°.

Figure 6:
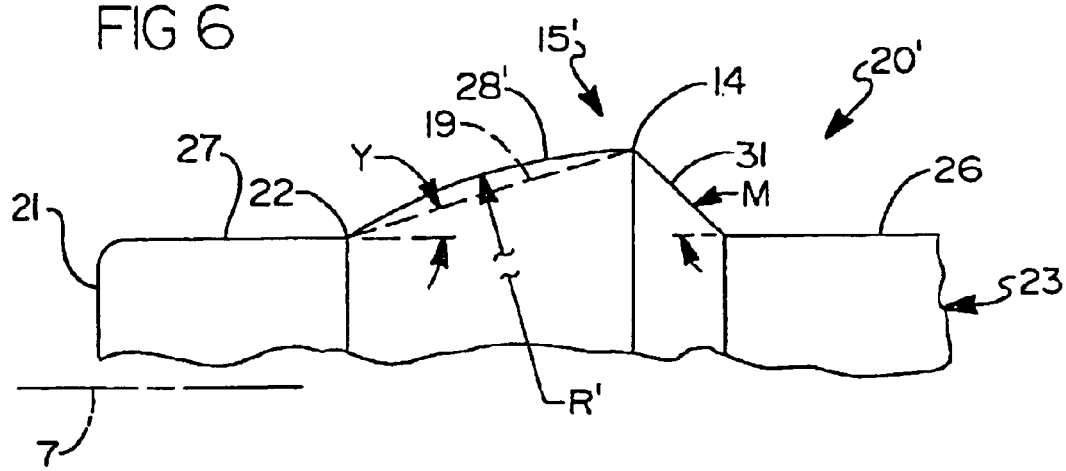
FIGS. 6 and 6A are partial cross-sectional views of two embodiments of the male coupling of the present invention.
Figure 6A:
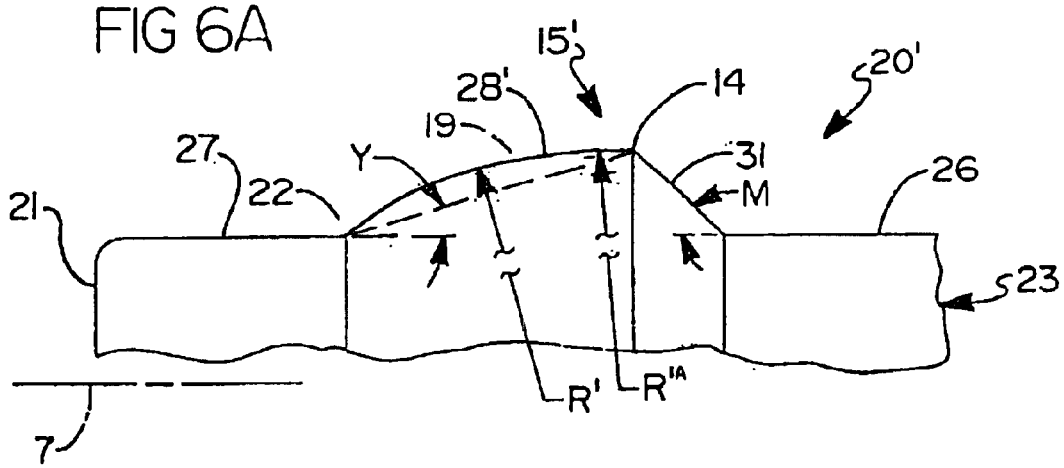

Now referring to FIG. 6, a first embodiment of the elevational view of the male member 20' of the present invention is shown. Refer to FIGS. 4 and 5 of this application and FIGS. 1 and 2 of U.S. Pat. No. 5,553,895 for examples of prior art male ramp configurations. The male member 20' extends from a leading end 21 to a trailing end 23 as shown in FIG. 1. The male member 20' has a trailing cylindrical exterior surface 26 and a leading cylindrical exterior surface 27 which are separated by a ridge or rib 15'. The leading end 21 is intended to be inserted into the female member 30. The rib 15' is comprised of a ramp 28' beginning at break point 22 and extending rearwardly (to the right) and outwardly from the leading exterior surface 27 at a curved angle. Shown in FIG. 6 for reference purposes is angle Y relative to the axis 7 which can vary along with the angle of the ramp 28' in the range of 10° to approximately 25°, preferably at an angle Y of 18°. According to the present invention, the profile of the ramp 28' has been changed from a uniform, straight, cone-like surface to an outwardly curved surface. A section of a circle having radius R' describes the approximate profile of the ramp 28' in the first embodiment of the present invention extending from the leading exterior surface 27 to the apex 14 of the ramp 28'. It is contemplated that the curved outer surface of the ramp 28' need not be a section of a circle with radius R' but could be varied in curvature ($R^1$ and $R^{1A}$) to yield the desired force verses displacement curve for the split locking ring 60 or other more complicated shapes could be utilized, as shown in FIG. 6A. The rib 15' of the first embodiment of the present invention provides a more desired force/displacement curve for the split metal locking ring 60 as it traverses the rib 28' upon insertion of the male member 20' into the female member 30.

Figure 7:
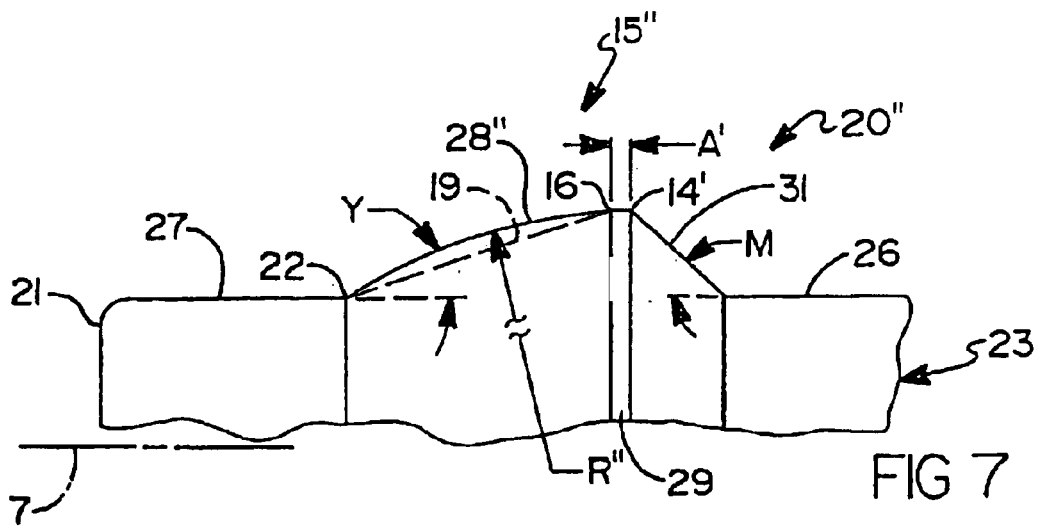
FIG. 7 is a partial cross-section view of another embodiment of the male coupling of the present invention.

Now referring to FIG. 7, an elevational view of a second embodiment of the male member 20" of the present invention is shown. The male member 20" extends from a leading end 21' to a trailing end 23 as shown in FIG. 7. The male member 20" has a trailing cylindrical exterior surface 26 and a leading cylindrical exterior surface 27 which are separated by a ridge or rib 15". The leading end 21 is intended to be inserted into the female member 30. The rib 15" is comprised of a ramp 28" extending rearwardly (to the right) and outwardly from the leading exterior surface 27. A flat 29 of width A' extends from the end of the ramp 28" at point 16 to the apex 14' of shoulder 31. The surface of the flat 29 extends approximately parallel to the axis 7 of the male member 20". The shoulder 31 is at an angle of M with the axis 7 of the male member 20" while the dotted line 19 from break point 22 to point 16 is at an angle Y of approximately in the range of 10° through 25° with a preferred value of 18°. The actual surface ramp 28" is radiused to extend outwardly from dotted line 19 and is shown shaped as a section of a circle with radius R" and intersecting at break point 22 and point 16. Radius R" is selected so that the maximum height of the ramp 28" does not exceed the height of the flat 29 above the axis 7 of the male member 20".

Figure 8:
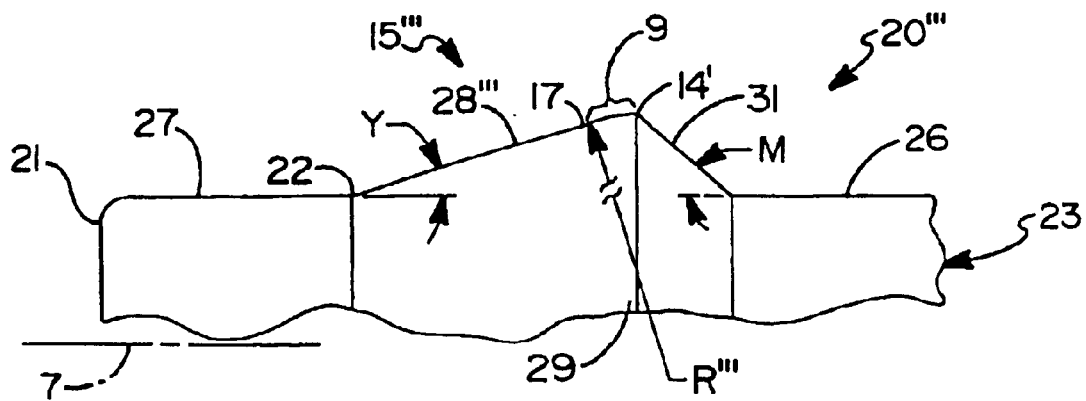
FIG. 8 is a partial cross-section view of another embodiment of the male coupling of the present invention.

Now referring to FIG. 8 of the drawings, a cross-sectional view of a third embodiment of the male member 20'" of the present invention is shown. The male member 20'" extends from a leading end 21 to a trailing end 23 as shown in FIG.

8. The male member 20''' has a trailing cylindrical exterior surface 26 and a leading cylindrical exterior surface 27 which are separated by a rib 15'''. The leading end 21 is intended to be inserted into the female member 30. The rib 15''' is comprised of a ramp 28''' extending rearwardly (to the right) to point 17 and outwardly from the leading exterior surface 27. The shoulder 31 is at an angle of M with the axis 7 of the male member 20'''. The ramp 28''' extends at a direct straight line from break point 22 to point 17 at an angle Y from the axis 7 although the ramp 28''' could extend in other shapes as well such as a curved shape. A radiused section having a radius R''' extends from point 17 to apex 14' and defines a radiused section 9. Radius R''' is chosen such that the maximum height of the ramp 28''' does not exceed the maximum height of the flat 29 from the axis 7 blends the ramp 28''' to the apex 14' and yields the desired insertion force verses displacement curve.

Figure 8A:
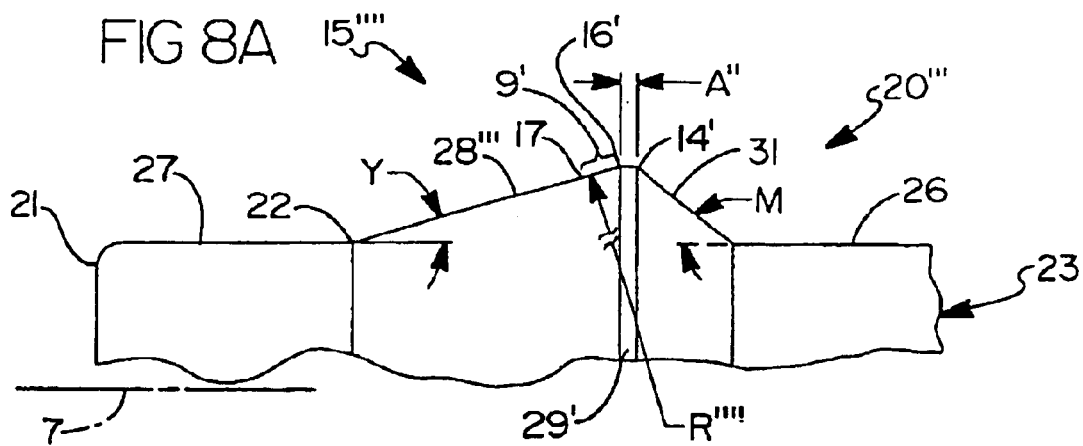
FIG. 8A is a partial cross-sectional view of another embodiment of the male coupling of the present invention.

Now referring to FIG. 8A of the drawings, a cross-sectional view of a fourth embodiment of the male member 20''' of the present invention is shown. The male member 20''' is similar to the male member 20''' shown in FIG. 8 except a flat 29' (flat) of width A" of approximately 0.010 inch joins the radiused section 19' extending from point 17 to point 16' to the apex 14'. The radiused section 19' as defined extending from point 17 to point 16' has a radius of R''' and blends in to join the ramp 28''' to the cylindrical surface 29'.

The male member 20''' extends from a leading end 21 to a trailing end 23 as shown in FIG. 8A. The male member 20''' has a trailing cylindrical exterior surface 26 and a leading cylindrical exterior surface 27 which are separated by a ridge or rib 15''''. The leading end 21 is intended to be inserted into the female member 30. The rib 15'''' is comprised of a ramp 28''' beginning at break point 22 and extending rearwardly (to the right) and extending in outwardly from the leading exterior surface 27. The ramp 28''' is connected to the apex 14' via first a radiused section 19' extending from point 17 to point 16' and then a cylindrical section or flat 29'.

The ramp 28''' extends at a direct straight line from break point 22 to point 17 at an angle Y from the axis 7. The ramp 28''' could also extend in other shapes such as a radiused cross-sectional shape or other curved or multiple straight line shapes. The radius R'''' is chosen to provide a blend between the ramp 28''' and the flat 29'. The combination of the ramp 28''', the radiused section 9' and the flat 29' combine to determine the characteristic of the insertion force as the male member 20''' is inserted into the female member 30.

Figure 9:
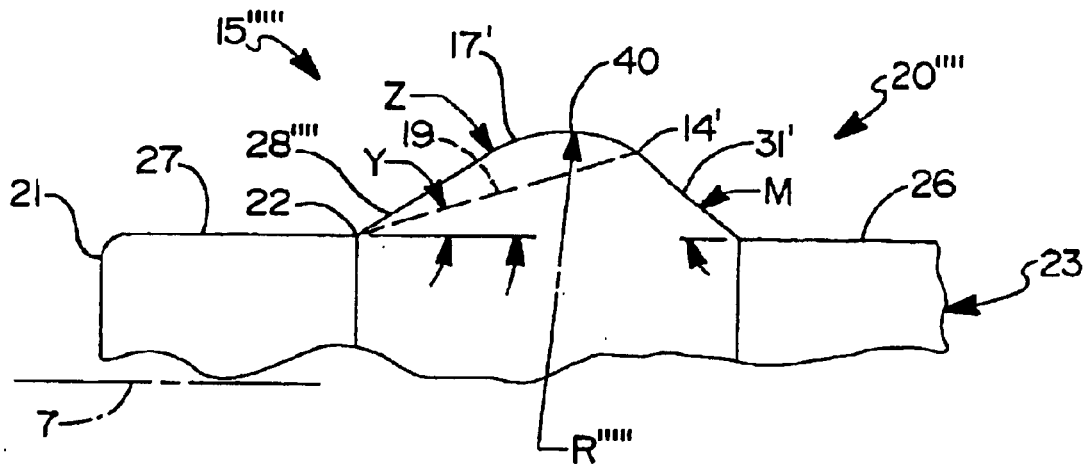
FIG. 9 is a partial cross-sectional view of another embodiment of the male coupling of the present invention.
Figure 12:
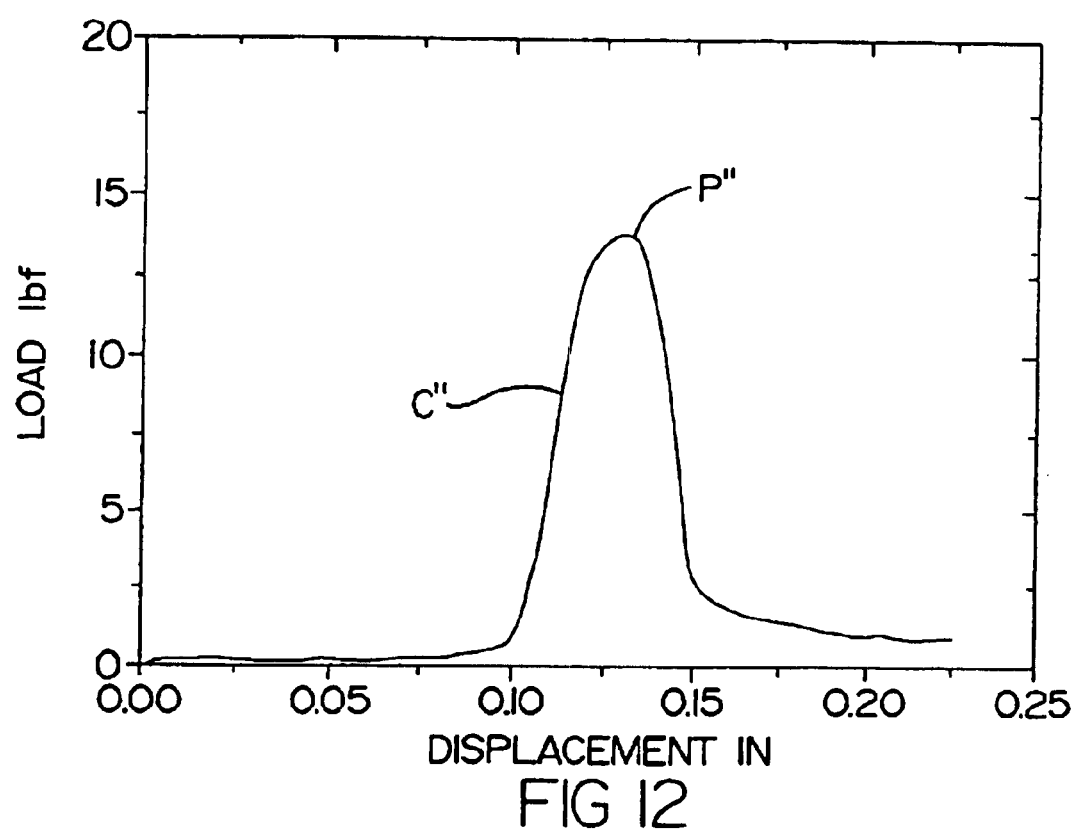
FIG. 12 is a connection force verses displacement graph of the connection system of the third embodiment of the present invention.

Now referring to FIG. 9 of the drawings, a partial cross-sectional view of a fourth embodiment of the male member 20'''' of the present invention is shown. The male member 20'''' extends from a leading end 21 to a trailing end 23 as shown in FIG. 9. The male member 20'''' has a trailing cylindrical exterior surface 26 and a leading cylindrical exterior surface 27 which are separated by a rib 15''''. The leading end 21 is intended to be inserted into the female member 30. The rib 15'''' is comprised of a ramp 28'''' extending rearwardly (to the right) and outwardly from the leading exterior surface 27 at an angle of Z as opposed to angle Y as shown in FIG. 8. The ramp 28'''' is shown as a relatively straight line extending from the break point 22 to the point 17' but could be slightly curved outwardly from the axis 7. From point 17' to apex 14', a outwardly extending curve is formed with a radius R'''' having a maximum distance from the axis 7 at point 40. The radial distance of point 40 from the axis 7 is greater than the radial distance of the apex 14' from the axis 7. This increased distance results in a favorable load verses displacement curve as shown in FIG. 12 for this fourth alternate embodiment. The locking ring 60 becomes trapped between the shoulder 31 and the chamfer 55 as previously described.

Figure 10:
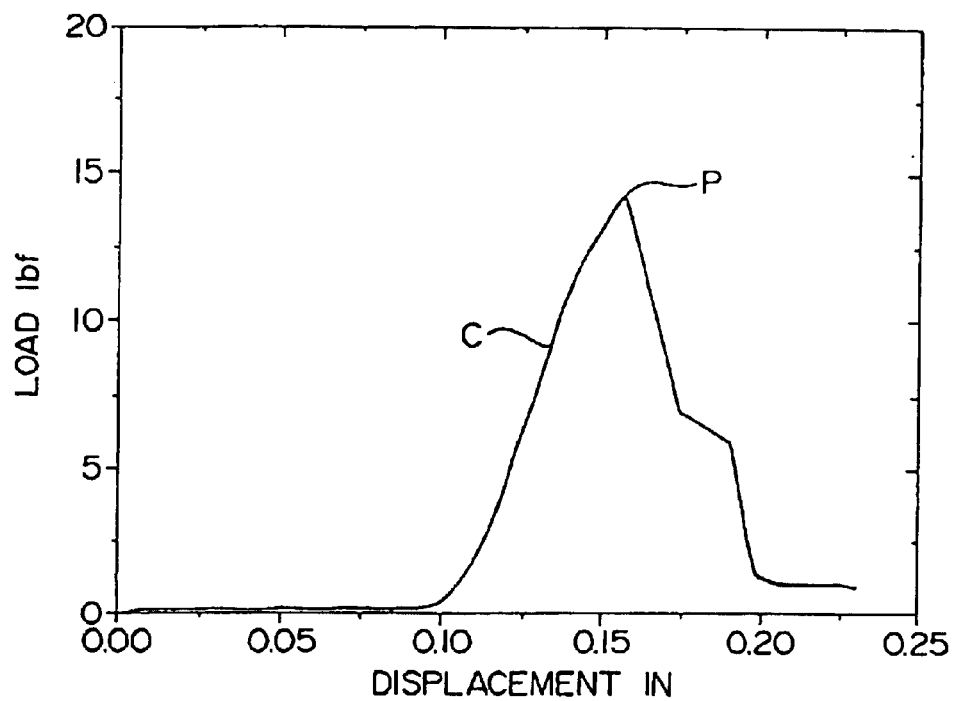
FIG. 10 is a connection force verses displacement graph of a prior art fluid connection system.

Now referring to FIG. 10, a graph of insertion force in pounds force verses displacement in inches for a typical prior art connector system such as that disclosed in U.S. Pat. No. 5,553,895 is shown. The male member 20 requires a minimum force ($lb_f$) to engage the female member 30 and complete the connection. This can be graphically represented in the graph shown in FIG. 10 for the prior art coupling where the curve C reaches a peak level of force of 14 $lb_f$ at point P at approximately 0.15 inch from the start of the ramp 28.

Figure 11:
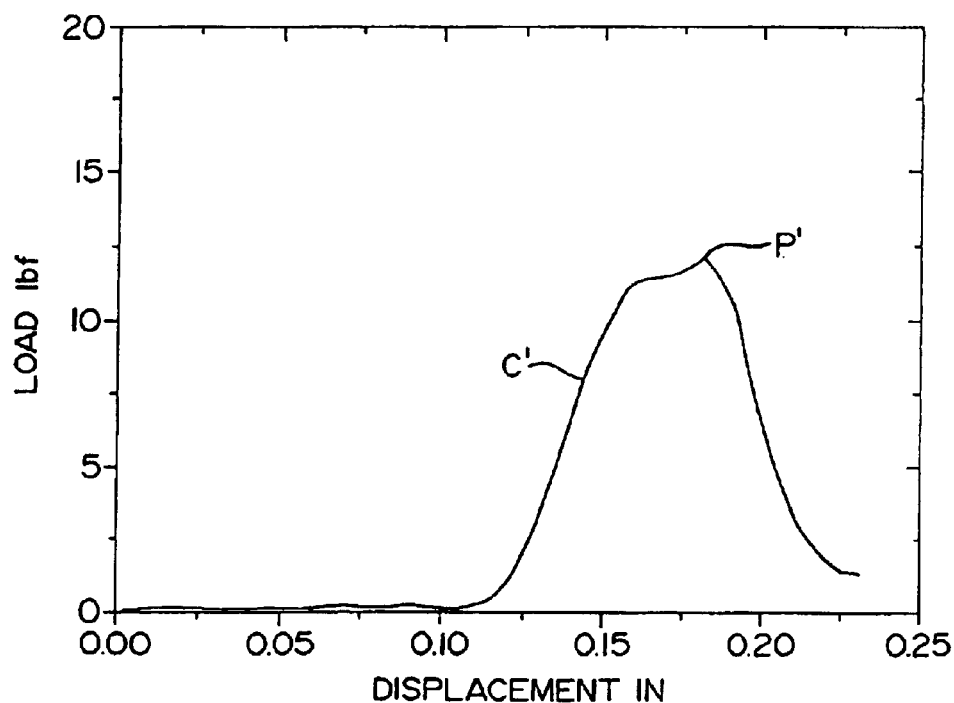
FIG. 11 is a connection force verses displacement graph of the connection system of the present invention.

FIG. 11 shows a graph of projected data for the insertion force in pounds force verses displacement in inches for the first three embodiments of the coupling of the present invention. Although the three embodiments as shown in FIGS. 6 through 8 will exhibit a slightly different characteristic force verses displacement curve, FIG. 11 is a typical result as the male member 20 is inserted into the female member 30. Curve C' increases in a manner similar to the curve C initially while the peak force P' of the coupling of the present invention is significantly lower at 12 $lb_f$. This results in a connection that is more easily made by an assembly person.

Now referring to FIG. 12 of the drawings, a graphical representation of the load required to connect the male member 20'''' into the female member 30 is shown. FIG. 12 is projected data for the shape of the male member 20'''' shown in FIG. 9. The load verses displacement graph shown in FIG. 11 applies generally to the male members shown in FIGS. 6 through 8.

Referring both to FIGS. 9 and 12, FIG. 12 shows that the load curve C'' increases at a fairly rapid rate as the locking ring 60 engages and travels up the ramp 28'''' to point 17 and reaches a peak value P'' of approximately 15 $lb_f$ an then rapidly decreases as the locking ring 60 reaches point 40 on the male member 20''''. After the locking ring 60 passes to the right of point 40, due to the forces generated when the locking ring 60 is increased in diameter over its free state, it actually helps pull the male member 20'''' into the female member 30 thereby assisting in effectuating the final connection where the locking ring 60 engages the shoulder 31 and the chamfer 55 as the locking ring 60 returns to its original diameter.

Many modifications in design and materials will become readily apparent to those skilled in the art. Accordingly, the scope of the present invention should be limited only by the scope of the claims appended hereto.

What is claimed is:

1. A coupling assembly having an axis comprising:
   (a) a male member extending from a leading end to a trailing end, a first cylindrical exterior surface extending from said leading end, a second cylindrical exterior surface spaced from said first cylindrical exterior surface and a rib between said first cylindrical exterior surface and said second cylindrical exterior surface, said rib including (i) a curved ramp extending axially away from said leading end and outwardly from said first exterior cylindrical surface at a radius, and (ii) a shoulder tapering inwardly and axially away from said first cylindrical exterior surface portion; and
   (b) a female member including a receiving end with a cavity sized to receive said male member, said cavity including a first inwardly facing cylindrical surface adjacent said receiving end sized to receive said rib, an inwardly facing annular groove including spaced apart first and second surfaces extending outwardly from said first inwardly facing cylindrical surface, said second groove surface being positioned between said receiving end and said first groove surface and including a chamfer tapering toward said axis and said receiving end of an angle relative to said axis which is less than the angle between said shoulder and said axis, and a second inwardly facing surface sized to receive said male member leading end and first cylindrical exterior surface;

(c) a split locking ring positioned in said female member inwardly facing annular groove and sized for movement in said annular groove, said split locking ring having a first end and a second end aligned for abutting relationship and having a gap, said split locking ring having an interior diameter sized to receive said male member first cylindrical exterior surface portion and to be engaged and expanded to a larger radial size by said ramp upon movement of said male member further into said cavity, said split locking ring retracting in diametrical size resiliently to become trapped between said shoulder and said chamfer upon the movement of said male member to a position in which said tapered shoulder is axially aligned with said split locking ring; and (d) a release member configured to urge said split locking ring toward said rib, and in doing so, to be urged outwardly by said shoulder.

2. The coupling assembly of claim 1, wherein the ramp is varied in curvature having a surface defined by more than one radius.

3. A coupling assembly having an axis comprising:

(a) a male member extending from a leading end to a trailing end, a first cylindrical exterior surface extending from said leading end, a second cylindrical exterior surface spaced from said first, cylindrical exterior surface and a rib between said first cylindrical exterior surface and said second cylindrical exterior surface, said rib including (i) a ramp extending axially away from said leading end and outwardly at a steadily increasing distance from said first exterior cylindrical surface joined to a radiused portion curved to join, (ii) a cylindrical exterior surface portion substantially parallel to said axis having a minimum axial distance of 0.010 inch, said cylindrical exterior surface joined to (iii) a shoulder tapering inwardly and axially away from said first cylindrical exterior surface portion; and (b) a female member including a receiving end with a cavity sized to receive said male member, said cavity including a first inwardly facing cylindrical surface adjacent said receiving end sized to receive said rib, an inwardly facing annular groove including spaced apart first and second surfaces extending outwardly from said first inwardly facing cylindrical surface, said second groove surface being positioned between said receiving end and said first groove surface and including a chamfer tapering toward said axis and said receiving end of an angle relative to said axis which is less than the angle between said shoulder and said axis, and a second inwardly facing surface sized to receive said male member leading end and first cylindrical exterior surface; and (c) a split locking ring positioned in said female member inwardly facing annular groove and sized for movement in said annular groove, said split locking ring having a first end and a second end aligned for abutting relationship and having a gap, said split locking ring having an interior diameter sized to receive said male member first cylindrical exterior surface portion and to be engaged and expanded to a larger radial size by said ramp upon movement of said male member further into said cavity, said split locking ring retracting in diametrical size resiliently to become trapped between said shoulder and said chamfer upon the movement of said male member to a position in which said tapered shoulder is axially aligned with said split locking ring.

4. A coupling assembly having an axis comprising:

(a) a male member extending from a leading end to a trailing end, a first cylindrical exterior surface extending from said leading end, a second cylindrical exterior surface spaced from said first cylindrical exterior surface and a rib between said first cylindrical exterior surface and said second cylindrical exterior surface, said rib including (i) a curved ramp extending axially away from said leading end and outwardly from said first exterior cylindrical surface at a radius to join, (ii) a cylindrical exterior surface portion substantially parallel to said axis having a minimum axial distance of 0.010 inch and (iii) a shoulder tapering inwardly and axially away from said first cylindrical exterior surface portion; and (b) a female member including a receiving end with a cavity sized to receive said male member, said cavity including a first inwardly facing cylindrical surface adjacent said receiving end sized to receive said rib, an inwardly facing annular groove including spaced apart first and second surfaces extending outwardly from said first inwardly facing cylindrical surface, said second groove surface being positioned between said receiving end and said first groove surface and including a chamfer tapering toward said axis and said receiving end of an angle relative to said axis which is less than the angle between said shoulder and said axis, and a second inwardly facing surface sized to receive said male member leading end and first cylindrical exterior surface; and (c) a split locking ring positioned in said female member inwardly facing annular groove and sized for movement in said annular groove, said split locking ring having a first end and a second end aligned for abutting relationship and having a gap, said split locking ring having an interior diameter sized to receive said male member first cylindrical exterior surface portion and to be engaged and expanded to a larger radial size by said ramp upon movement of said male member further into said cavity, said split locking ring retracting in diametrical size resiliently to become trapped between said shoulder and said chamfer upon the movement of said male member to a position in which said tapered shoulder is axially aligned with said split locking ring.

5. A coupling assembly having an axis comprising:

(a) a male member extending from a leading end to a trailing end, a first cylindrical exterior surface extending from said leading end, a second cylindrical exterior surface spaced from said first cylindrical exterior surface and a rib between said first cylindrical exterior surface and said second cylindrical exterior surface, said rib including (i) a ramp extending axially away from said leading end joined to (ii) a radiused portion extending in a curved manner from said first exterior cylindrical surface joined to (iii) a shoulder tapering inwardly and axially away from said first cylindrical exterior surface portion; where the maximum distance of said radiused portion from said first cylindrical exterior surface exceeds the maximum distance of said shoulder from said first cylindrical exterior surface; and (b) a female member including a receiving end with a cavity sized to receive said male member, said cavity including a first inwardly facing cylindrical surface adjacent said receiving end sized to receive said rib, an inwardly facing annular groove including spaced apart first and second surfaces extending outwardly from said first inwardly facing cylindrical surface, said second groove surface being positioned between said receiving end and said first groove surface and including a chamfer tapering toward said axis and said receiving end of an angle relative to said axis which is less than the angle between said shoulder and said axis, and a second inwardly facing surface sized to receive said male member leading end and first cylindrical exterior surface; and (c) a split locking ring positioned in said female member inwardly facing annular groove and sized for movement in said annular groove, said split locking ring having a first end and a second end aligned for abutting relationship and having a gap, said split locking ring having an interior diameter sized to receive said male member first cylindrical exterior surface portion and to be engaged and expanded to a larger radial size by said ramp upon movement of said male member further into said cavity, said split locking ring retracting in diametrical size resiliently to become trapped between said shoulder and said chamfer upon the movement of said male member to a position in which said tapered shoulder is axially aligned with said split locking ring.

6. A coupling assembly having an axis comprising:

(a) a male member extending from a leading end to a trailing end, a first cylindrical exterior surface extending from said leading end, a second cylindrical exterior surface spaced from said first cylindrical exterior surface and a rib between said first cylindrical exterior surface and said second cylindrical exterior surface, said rib including (i) a ramp extending axially away from said leading end joined to (ii) a radiused portion extending in a curved manner from said first exterior cylindrical surface joined to (iii) a cylindrical exterior surface portion substantially parallel to said axis, said cylindrical exterior surface portion joined to (iv) a shoulder tapering inwardly and axially away from said first cylindrical exterior surface portion; where the maximum distance of said radiused portion from said first cylindrical exterior surface exceeds the maximum distance of said shoulder from said first cylindrical exterior surface; and (b) a female member including a receiving end with a cavity sized to receive said male member, said cavity including a first inwardly facing cylindrical surface adjacent said receiving end sized to receive said rib, an inwardly facing annular groove including spaced apart first and second surfaces extending outwardly from said first inwardly facing cylindrical surface, said second groove surface being positioned between said receiving end and said first groove surface and including a chamfer tapering toward said axis and said receiving end of an angle relative to said axis which is less than the angle between said shoulder and said axis, and a second inwardly facing surface sized to receive said male member leading end and first cylindrical exterior surface; and (c) a split locking ring positioned in said female member inwardly facing annular groove and sized for movement in said annular groove, said split locking ring having a first end and a second end aligned for abutting relationship and having a gap, said split locking ring having an interior diameter sized to receive said male member first cylindrical exterior surface portion and to be engaged and expanded to a larger radial size by said ramp upon movement of said male member further into said cavity, said split locking ring retracting in diametrical size resiliently to become trapped between said shoulder and said chamfer upon the movement of said male member to a position in which said tapered shoulder is axially aligned with said split locking ring.

7. A coupling assembly having an axis comprising:

(a) a male member extending from a leading end to a trailing end, a first cylindrical exterior surface extending from said leading end, a second cylindrical exterior surface spaced from said first cylindrical exterior surface and a rib between said first cylindrical exterior surface and said second cylindrical exterior surface, said rib including (i) a ramp extending axially away from said leading end and outwardly from said first exterior cylindrical surface, the ramp varied in curvature and having a surface defined by more than one radius, and (ii) a shoulder tapering inwardly and axially away from said first cylindrical exterior surface portion; and (b) a female member including a receiving end with a cavity sized to receive said male member, said cavity including a first inwardly facing cylindrical surface adjacent said receiving end sized to receive said rib, an inwardly facing annular groove including spaced apart first and second surfaces extending outwardly from said first inwardly facing cylindrical surface, said second groove surface being positioned between said receiving end and said first groove surface and including a chamfer tapering toward said axis and said receiving end of an angle relative to said axis which is less than the angle between said shoulder and said axis, and a second inwardly facing surface sized to receive said male member leading end and first cylindrical exterior surface; and (c) a split locking ring positioned in said female member inwardly facing annular groove and sized for movement in said annular groove, said split locking ring having a first end and a second end aligned for abutting relationship and having a gap, said split locking ring having an interior diameter sized to receive said male member first cylindrical exterior surface portion and to be engaged and expanded to a larger radial size by said ramp upon movement of said male member further into said cavity, said split locking ring retracting in diametrical size resiliently to become trapped between said shoulder and said chamfer upon the movement of said male member to a position in which said tapered shoulder is axially aligned with said split locking ring.

8. A coupling assembly having an axis comprising:

(a) a male member extending from a leading end to a trailing end, a first cylindrical exterior surface extending from said leading end, a second cylindrical exterior surface spaced from said first cylindrical exterior surface and a rib between said first cylindrical exterior surface and said second cylindrical exterior surface, said rib including (i) a ramp extending axially away from said leading end and joined to (ii) a radiused portion extending in a curved manner and joined to (iii)

a shoulder tapering inwardly and axially away from said first cylindrical exterior surface portion; and (b) a female member including a receiving end with a cavity sized to receive said male member, said cavity including a first inwardly facing cylindrical surface adjacent said receiving end sized to receive said rib, an inwardly facing annular groove including spaced apart first and second surfaces extending outwardly from said first inwardly facing cylindrical surface, said second groove surface being positioned between said receiving end and said first groove surface and including a chamfer tapering toward said axis and said receiving end of an angle relative to said axis which is less than the angle between said shoulder and said axis, and a second inwardly facing surface sized to receive said male member leading end and first cylindrical exterior surface; and (c) a split locking ring positioned in said female member inwardly facing annular groove and sized for movement in said annular groove, said split locking ring having a first end and a second end aligned for abutting relationship and having a gap, said split locking ring having an interior diameter sized to receive said male member first cylindrical exterior surface portion and to be engaged and expanded to a larger radial size by said ramp upon movement of said male member further into said cavity, said split locking ring retracting in diametrical size resiliently to become trapped between said shoulder and said chamfer upon the movement of said male member to a position in which said tapered shoulder is axially aligned with said split locking ring.

9. The coupling assembly of claim 8, further including a release member configured to urge said split locking ring toward said rib, and in doing so, to be urged outwardly by said shoulder.

* * * * *